Figure 1:
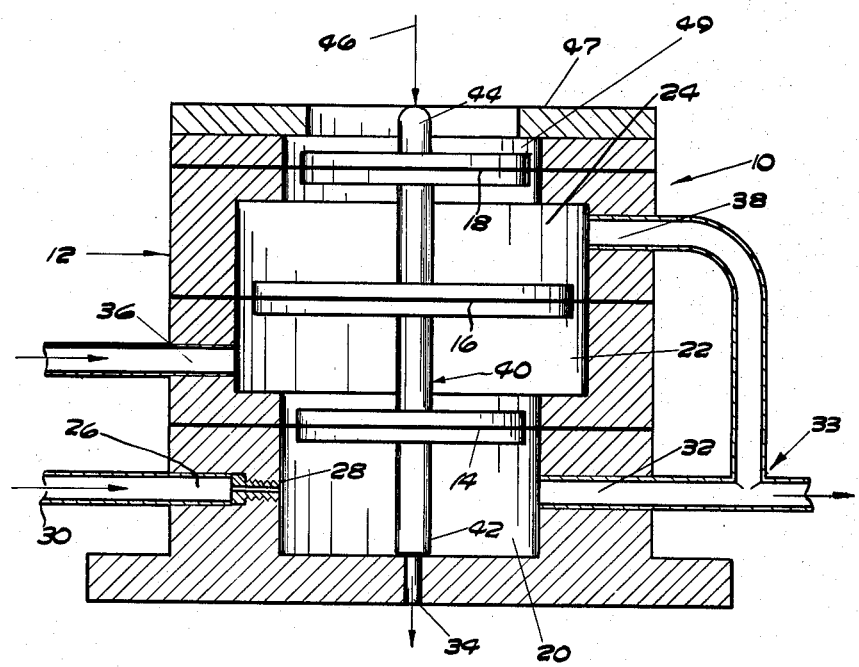

Sept. 8, 1964

M. D. L. ROME 3,147,616

LOAD CELL

Filed Jan. 15, 1962

2 Sheets-Sheet 1

Sept. 8, 1964
M. D. L. ROME
3,147,616
LOAD CELL
Filed Jan. 15, 1962
2 Sheets-Sheet 2
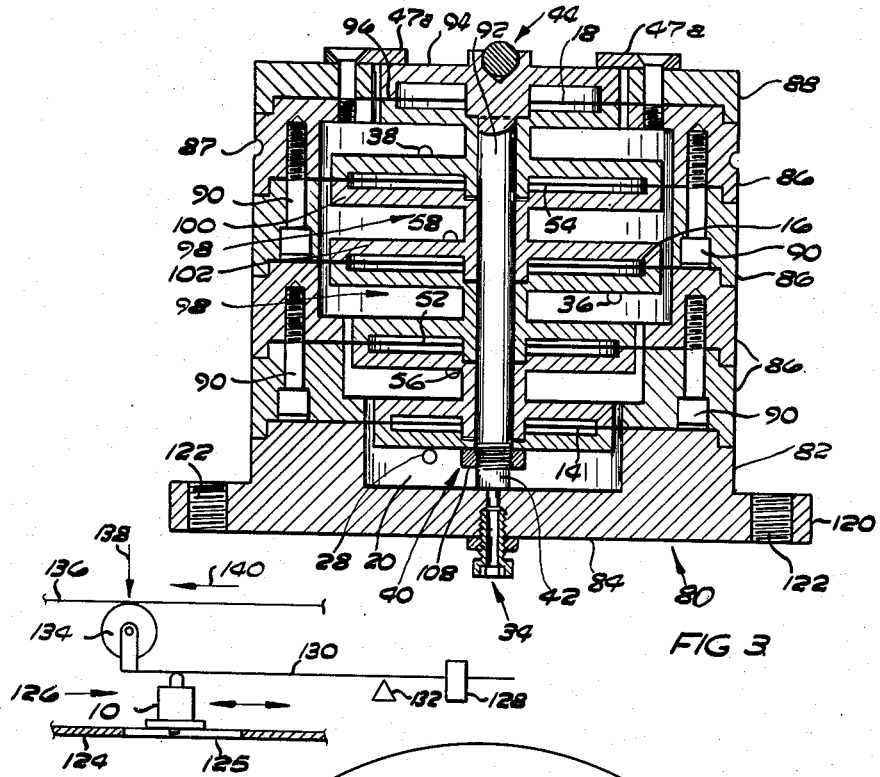
FIG 3
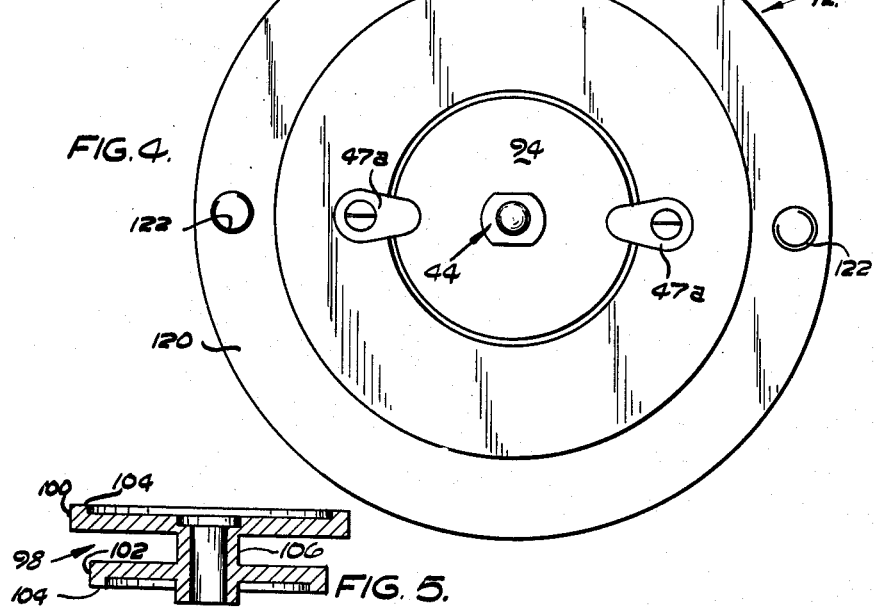
FIG. 6.
FIG. 4.
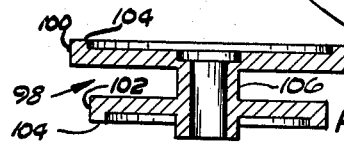
FIG. 5.

United States Patent Office 3,147,616
Patented Sept. 8, 1964

3,147,616
LOAD CELL
Matthew D. L. Rome, Johannesburg, Transvaal, Republic of South Africa, assignor to The United Tobacco Companies (South) Limited, Johannesburg, Transvaal, Republic of South Africa
Filed Jan. 15, 1962, Ser. No. 166,153
Claims priority, application Republic of South Africa Jan. 26, 1961
8 Claims. (Cl. 73—141)

This invention relates to load cells adapted to measure loads applied to them, and in particular to load cells suitable for use with weighing carriages for weighing material in transit on a conveyor belt.

It is an object of this invention to provide a sensitive load cell which is responsive to light loadings.

According to the invention broadly, a load cell comprises a cylindrical and an end wall; at least three axially spaced resiliently flexible walls in the form of diaphragms, namely far, middle, and near diaphragms, coacting sealingly with the cylindrical and end walls to provide coaxial axially spaced compartments, namely, a far-end compartment, a middle compartment and a near-end compartment, the area of the middle diaphragm being greater than the area of the far diaphragm; a rigid pillar coaxial with the compartments and fast with the diaphragms and displaceable with them; the far-end compartment being defined by the cylindrical and end walls and the far diaphragm and having a fluid inlet opening into it and having means for connection to a supply of fluid under pressure, a fluid outlet opening out of it and having means for connection to fluid pressure measuring means, and a fluid exhaust opening adapted to exhaust fluid at a rate faster than can be admitted through the inlet opening; the middle compartment being defined by the cylindrical wall and the far and middle diaphragms and having a fluid inlet opening into it and having means for connection to a control pressure fluid supply; and the near-end compartment defined by the cylindrical wall and the middle and near diaphragms and having an opening having means for connection to the far-end compartment; there being further provided a valve closure member in the far-end compartment seatable closably over the exhaust opening and adapted to be unseated by axial displacement of the rigid pillar, and a load anvil fast with the pillar adapted to receive an externally applied load, the arrangement being such that the diaphragms are adapted to flex under fluid pressure applied to the compartments and to be displaced by the pressure against the action of a load applied to the anvil.

The fluid inlet opening into the far-end compartment may comprise an inlet orifice in the cylindrical wall. The fluid pressure measuring means may be a pressure gauge. The resiliently flexible walls may be metal diaphragms or organic material either flat in form or convoluted, and the diaphragm between near-end and middle compartments, may have a diameter larger than the other diaphragms and may even have the same area as the two together. The total deflection of the diaphragms and hence the displacement of the pillar may be limited by stops provided. The fluid under pressure may be air.

Further features of the invention will become apparent from the following desciption of two embodiments with reference to the accompanying drawings.

Figure 2:
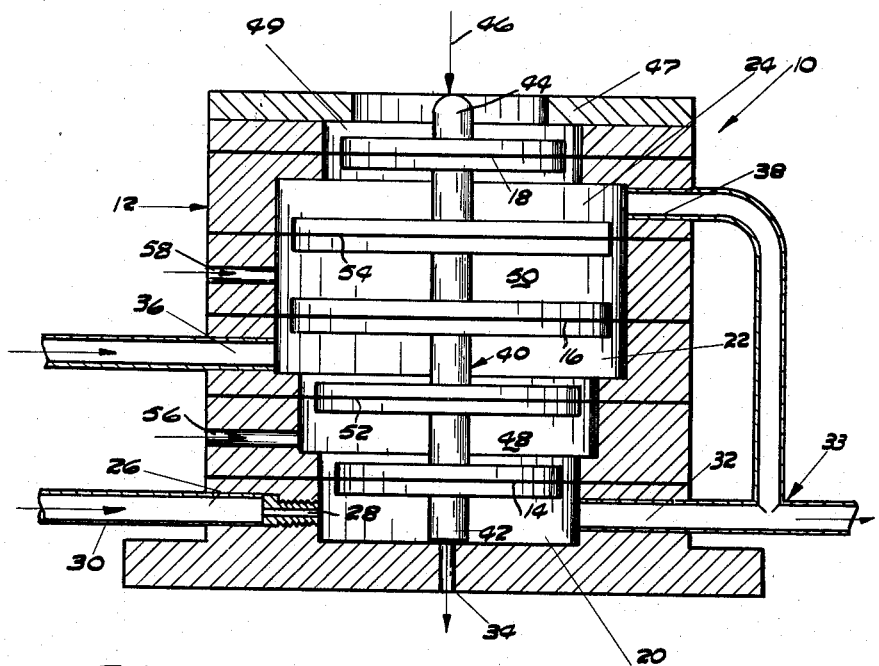

In the drawings:
FIGURE 1 shows diagrammatically in sectional side elevation one embodiment of the invention;
FIGURE 2 shows diagrammatically a similar view of another embodiment;
FIGURE 3 shows a sectional side elevation of the construction of the embodiment shown in FIGURE 2;
FIGURE 4 shows a plan view corresponding to FIGURE 3;
FIGURE 5 shows a sectional side elevation of a disc member; and
FIGURE 6 shows diagrammatically apparatus for using the cell.

Referring to FIGURE 1, the load cell 10 has a cylindrical wall 12, three axially spaced diaphragms, far diaphragm 14, a middle diaphragm 16, and a near diaphragm 18, to define three axially spaced compartments in association with the cylindrical wall 12, namely the far-end compartment 20, the middle compartment 22, and the near-end compartment 24. Diaphragm 16 has a larger effective area than diaphragms 14 and 18. Compartment 20 has a fluid inlet opening 26 comprising orifice 28 and has means 30 for connection to a supply of fluid under pressure, a fluid outlet opening 32 for connection through means 33 to a pressure gauge or like device (not shown), and an exhaust opening 34. Compartment 22 has a control fluid pressure inlet opening 36 and compartment 24 has a fluid pressure opening 38 for connection internally or externally to opening 32. Exhaust opening 34 is adapted to exhaust fluid at a faster rate than can be admitted through orifice 28.

Fast with the diaphragms is provided rigid pillar 40 having a closure member 42, adapted to seat closably on exhaust opening 34. The pillar 40 has anvil 44 for receiving load in the direction of arrow 46. The axial displacement of the pillar 40 in a direction against the load is limited by stop means 47. The gap 49 may be varied by means of suitable shims or spacers.

Referring to FIGURE 2, first and second additional compartments 48 and 50 having first and second additional diaphragms 52 and 54 are provided. The compartments 48 and 50 are vented to atmosphere by means of vents 56 and 58 to ensure that slight leakages of fluid from compartments 20 and 24 which may occur through the diaphragms do not cause inaccuracies in the operation of the cell or when convoluted diaphragms are used that pressure is applied to one side only of the diaphragm, i. e. that side of the diaphragm with concave convolution. The effective area of diaphragm 52 is larger than that of diaphragm 14 but is smaller than that of diaphragm 16. Diaphragm 54 has the same effective area as diaphragm 16 and is larger than diaphragm 18.

Referring to FIGURES 3 and 4 of the drawings, the parts used in the assembly of a load cell are shown. There is shown a base member 80 having a cylindrical wall part 82 and an end wall 84 defining a blind bore forming part of compartment 20. On top of this base member there are provided a plurality of intermediate rings 86 and upper ring 88 comprising the cylindrical wall 12 and having varying bores corresponding to the several compartments. The base member 80 and the several rings 86 and 88 are secured together by circumferentially spaced staggered set screws 90 clamping the rings and diaphragms together.

The pillar 40 is comprised of a central rod 92 having a coaxial dished disc 94 fast with it at the anvil end, the disc having an annular face 96 in a plane to the normal to the disc axis. It comprises further a plurality of disc members 98 each having two discs 100 and 102 having annular faces 104 and connected by a hollow stem 106. The hollow stems 106 are arranged on central rod 92 in axially spaced relation and are securely clamped together by nut 108, whereby annular faces 104 clamp sealingly on opposite sides of the diaphragms.

On top of upper ring 88 there are provided stop means in the form of tongues 47a. Shims are provided under the tongues whereby the maximum lift of the anvil may be adjusted to about one tenth of a millimetre. The uppermost ring 86 has an annular groove 87 for receiving the rim of a dust cup for protection.

The base member has a circumferential flange 120, and tapped holes 122 whereby the cell may be screwed down adjustably in position onto a suport structure such as a slotted member 124 (see FIGURE 5) having a longitudinal slot 125. In this figure there is shown a weighing carriage generally designated by reference numeral 126. The carriage is partially counter-balanced by balance weight 128, to take up the weight of most of the carriage itself, weigh roller 134, and so on, on the cell 10. Lever 130 is mounted to pivot about fulcrum 132, balance weight 128 and roller 134 being mounted on opposite sides of the fulcrum 132. Conveyor belt 136 carrying a load 138 is adapted to travel in direction 140 over roller 134.

In use, air under pressure is admitted into the far-end chamber 20 and this balances a load applied to the anvil 44, because as soon as unbalance occurs the exhaust opening 34 closes and more air is admitted until balance occurs. The air pressure in this chamber 20 is measured by a pressure gauge and is a measure of the load applied to the anvil. Initial dead weight loading which is to be subtracted from the load to be determined can be balanced by adjusting the position of counter-balance weight 128 and by connecting the inlet opening 36 of the middle compartment 22 to a control air supply under constant pressure which can be less or greater or even equal to far-end compartment air supply. The counter-balance weight 128 can be adjusted in position to provide coarse tare. Fine tare adjustment can be obtained by applying a steady fluid pressure to the centre or tare section (compartment 22) of the load cell itself. This can be conveniently regulated remotely from the position near the pressure gauge so that the gauge reads zero weight with an empty conveyor belt running over.

The initial loading can thus easily be balanced by a suitable choice of differential pressures and of diaphragm areas. Thus for example the cell may be supplied with a pressure of about 20 p.s.i. (roughly 1.4 kilograms per square centimetre) or through a differential pressure regulator which is adapted to maintain a difference in pressure of 3 p.s.i. (roughly 0.2 kilogram per square centimetre) across the cell.

The degree of sensitivity of this type of cell can be suitably chosen by using a diaphragm 16 between middle compartment 22 and near-end compartment 24 suitably larger in area than either of the other two 14 and 18 and by a suitable choice of control pressure. As the area of the middle diaphragm becomes smaller in relation to the sum of the areas of the other two diaphragms, so the cell may weigh heavier and heavier loads for a given fluid pressure.

It is an advantage of this invention that for light loads, this cell can be of robust construction for industrial use.

I claim:

1. A load cell which comprises a cylindrical wall and an end wall; at least three axially spaced resiliently flexible walls in the form of diaphragms, namely far, middle, and near diaphragms, coacting sealingly with the cylindrical wall and the end wall to provide coaxial axially spaced compartments, namely a far-end compartment, a middle compartment, and a near-end compartment, the area of the middle diaphragm being greater than the area of the far diaphragm; a rigid pillar coaxial with the compartments and fast with the diaphragms and displaceable with them; the far-end compartment being defined by the cylindrical wall, the end wall and the far diaphragm, means defining a fluid inlet opening into the far-end compartment and being adapted for connection to a supply of fluid under pressure, means defining a fluid outlet opening out of the far-end compartment being adapted for connection to fluid pressure measuring means, and means defining a fluid exhaust opening adapted to exhaust fluid at a rate faster than can be admitted through the inlet opening; the middle compartment being defined by the cylindrical wall and the far and middle diaphragms, means defining a fluid inlet opening into the middle compartment and being adapted for connection to a control pressure fluid supply; and the near-end compartment being defined by the cylindrical wall and the middle and near diaphragms, means defining an opening for the near-end compartment, and means connecting the opening of the near-end compartment to the fluid outlet opening of the far-end compartment to establish communication between the near-end and far-end compartments; there being further provided a valve closure member in the far-end compartment seatable closably over the exhaust opening and adapted to be unseated by axial displacement of the rigid pillar, and a load anvil fast with the pillar adapted to receive an externally applied load, the arrangement being such that the diaphragms are adapted to flex under fluid pressure applied to the compartments and to be displaced by the pressure against the action of a load applied to the anvil.

2. A load cell according to claim 1 in which the area of the middle diaphragm is greater than the area of the near diaphragm.

3. A load cell according to claim 1 in which there is provided a first additional diaphragm between far and middle diaphragms and having an area less than the middle diaphragm and defining a first additional compartment in association with the cylindrical wall and the far diaphragm, and in which there is provided a second additional diaphragm between middle and near diaphragms and defining a second additional compartment in association with the cylindrical wall and the middle diaphragm, each additional compartment having an opening for venting it to atmosphere.

4. A load cell according to claim 3 in which the first additional diaphragm has an area greater than the far diaphragm.

5. A load cell according to claim 3 in which the second additional diaphragm has an area equal to that of the middle diaphragm but larger than that of the near diaphragm.

6. A load cell according to claim 1 in which the exhaust opening in the far end compartment is coaxial with the pillar and in which the valve closure member is fast with that end of the pillar opposite the anvil.

7. A load cell according to claim 6 in which the cylindrical wall and the end wall are comprised by a base member having a blind bore and an exhaust opening through the end wall and coaxial with the bore, a plurality of rings arranged to seat sealingly one on top of another, in stacked relation, the diaphragms being clamped sealingly between the rings, the bores of the several rings corresponding to the areas of the several diaphragms and the openings into the several compartments being provided by radial holes through the rings; and in which the pillar comprises a central rod having a coaxial dished disc fast with it at the anvil end opposite the valve closure member, the disc having an annular face in a plane normal to the disc axis, a plurality of disc members having hollow stems arranged on the rod in axially spaced relation and each having two outwardly directed annular faces connected by the hollow stem and mating with faces of adjacent disc members to clamp the diaphragms sealingly between them, the axial length between the annular faces of a disc member corresponding to the axial height of the corresponding ring, and clamp means to clamp together the hollow stems arranged on the rod.

8. A load cell according to claim 1, in which stop means are provided to limit the axial displacement of the pillar against the action of the load and comprising at least one inwardly projecting tongue fast with the cylindrical wall.

References Cited in the file of this patent

UNITED STATES PATENTS

| | | |
|---|---|---|
| 1,580,430 | Gaines | Apr. 13, 1926 |
| 2,451,451 | Tate | Oct. 12, 1948 |
| 2,703,008 | Seljos et al. | Mar. 1, 1955 |
| 2,882,037 | Close et al. | Apr. 14, 1959 |

FOREIGN PATENTS

| | | |
|---|---|---|
| 278,967 | Germany | Oct. 7, 1914 |